United States Patent [19]

Tigges

[11] Patent Number: 4,742,422
[45] Date of Patent: May 3, 1988

[54] SELF-MONITORING FAULT CURRENT SAFETY SWITCH

[75] Inventor: Burkhard Tigges, Kirchhundem, Fed. Rep. of Germany

[73] Assignee: Werner Turck GmbH & Co. KG, Halver, Fed. Rep. of Germany

[21] Appl. No.: 920,421

[22] Filed: Oct. 20, 1986

[30] Foreign Application Priority Data

Oct. 18, 1985 [DE] Fed. Rep. of Germany ....... 3537140

[51] Int. Cl.$^4$ .............................................. H02H 3/08
[52] U.S. Cl. ........................................ 361/45; 361/91; 361/110
[58] Field of Search .................................... 361/44–50, 361/57, 87, 93, 85, 110; 324/51

[56] References Cited

U.S. PATENT DOCUMENTS

| | | | |
|---|---|---|---|
| 3,786,356 | 1/1974 | MacPhee | 361/45 |
| 3,973,317 | 8/1976 | Howell | 361/45 |
| 4,598,331 | 7/1981 | Legatti | 361/45 X |

FOREIGN PATENT DOCUMENTS 1944241 3/1971 Fed. Rep. of Germany .
2943725 5/1981 Fed. Rep. of Germany .

Primary Examiner—A. D. Pellinen
Assistant Examiner—Todd E. DeBoer
Attorney, Agent, or Firm—Antonelli, Terry & Wands

[57] ABSTRACT

A fault current circuit breaker for monitoring electrical circuits having a total current converter with a primary circuit including supply and return leads which are to be monitored and a secondary winding acting upon an electronic limiting value circuit which controls an electromagnetic retaining device. Switch contacts are provided for switching the circuit to be monitored when a predetermined fault current is exceeded. In order to enable self-monitoring, a current is briefly and periodically fed into an additional winding of the total current converter, with the current simulating a fault current, and a pulse voltage which appears at the output of the electronic limit value circuit due to the current in the additional winding is fed to an evaluation circuit, which causes the switch contacts to open in the absence of periodic pulses coming through the electromagnetic retaining device.

4 Claims, 1 Drawing Sheet

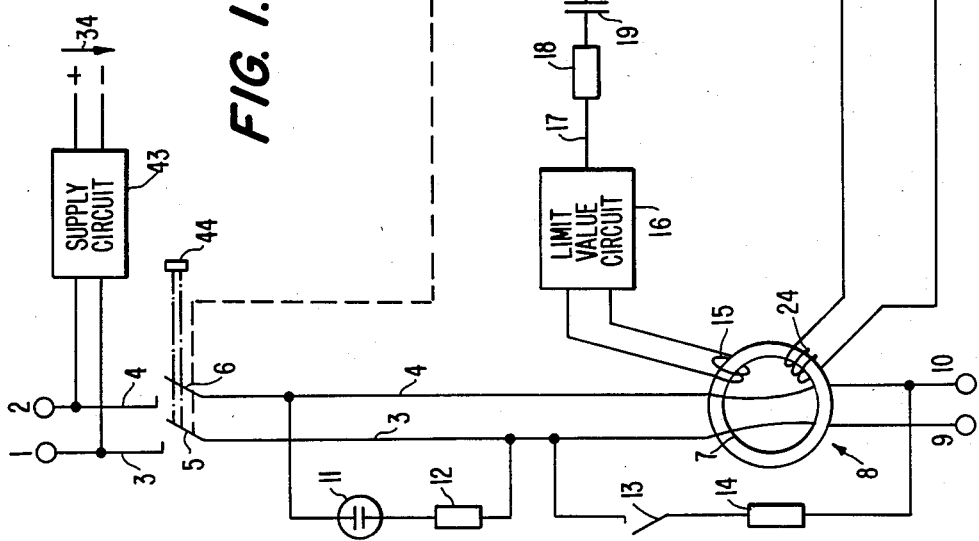
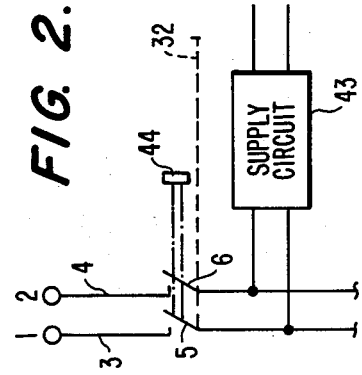

SELF-MONITORING FAULT CURRENT SAFETY SWITCH

The present invention relates to a switch and, more particularly, to a fault current safety switch for monitoring insulation of electrical circuits, with a total current converter having a primary circuit including supply and return leads of the circuit to be monitored and a secondary winding acting on an electronic limit value circuit, and with an electromagnetic holding device controlled by the electronic limit value circuit and switch contacts controlled by an electromagnetic holding device to switch off the circuit being monitored if a specific fault current is exceeded.

In, for example, German Patent No. 552,678, a fault current safety switch is proposed for electrical equipment for insulation monitoring for protection against the danger of fire caused by fault currents and for protecting people from electrical shock. A fault current is defined as an electric current which flows along undesired paths as a result of a defect in insulation in the circuit. The value of the fault current is determined by the difference between the value of the currents flowing into the system and those flowing out of the system. The purpose of the fault current safety switch is to completely separate that part of the system to be monitored from the power supply network if a fault current exceeds a preset value.

Fault current safety switches have been proposed which include a total current converter in which all of the conductors carrying the operating current of the part of the system to be monitored, in other words, the supply and return leads, are guided through a current converter core in such a manner that the magnetic flux in the current converter core corresponds to a sum of the operating currents, that is, taking into account the intended flow direction and difference in value between the currents flowing into the system and the currents flowing out of the system. The secondary winding of the total current converter thus carries a current which is directly proportional to the fault current, with the secondary current acting on a triggering magnet such that, when the fault current exceeds a preset design value, the triggering magnet releases a mechanical latch on the switch contacts which open, under a spring force, to disconnect the circuit to be monitored. The disconnection of the circuit usually takes place very rapidly in, for example, 0.2 seconds. The open contacts can then once again be closed against the spring force by pressing an actuating button or the like. A mechanical latch then holds the contacts closed as long as no fault current of the set value arises or flows. The switch or actuating button may be of the type described in, for example, German Patent Nos. 3,142,522 and 3,341,874 which utilize a mechanically acting free release so that it is not possible to hold the contacts in a closed position by constantly operating the switching button when a fault current of an extremely high value has released the latch.

When insulation defects occur in devices with metal housings, the fault current normally flows through the protective conductor connected to the housing. The fault current safety swtich then immediately turns off the device as soon as a corresponding insulation defect occurs. The rated fault current at an excess value of which the fault current safety switch switches the system off can thus be set at a relatively low value regardless of the operating current value thereby providing excellent protection against the danger of a fire caused by fault currents.

The rapid shutting off means that the voltage applied to the exposed metal parts in the event of an insulation defect can reach dangerous levels only for a very short period of time thereby providing excellent protection for persons against electrical shock or the like. When fault current safety switches with low rated fault currents are used such as, for example, 30 mA or 10 mA, protection for persons against electrical shocks is provided even when the protective conductor is broken or direct contact with the current-carrying part exists. The fault current which then flows through the person causes the fault current safety switch to switch off the current without endangering the health of the person.

As readily apparent, the advantage of using fault current safety switches are numerous; however, a disadvantage of fault current safety switches resides in the fact that a failure of the functional ability of the fault current safety switch may go unobserved. This is particularly true in situations where the fault current safety switch is a low rated fault current in which the power for actuating the triggering magnet supplied by the fault current is low, because of the mechanical parts required, the functional readiness cannot be ensured for an indeterminate time. For this reason, a regular function test is provided for known fault current safety switches. For this purpose, the fault current safety switches are equipped with a button which, when actuated causes a current, determined by a resistor, to deliberately bypass the total current converter, necessarily triggering the fault current safety switch.

To avoid if not minimize the above noted disadvantage, fault current safety switches have been proposed wherein the secondary current of the total current converter is not used directly for actuating the triggering magnet, but rather the secondary current of the total current converter is fed to an electronic circuit which causes the switch to shut off when the rated fault current is exceeded. A triggering magnet with a high power can thus be used for this purpose; however, a holding magnet may also be used instead of a triggering magnet, with the holding magnet maintaining the switch contact for the circuit being monitored in a state which causes the switch contacts to continuously conduct current in the manner of a relay or circuit breaker. When the rated fault current is exceeded, the electronic circuit then interrupts the holding magnet current causing the switch contacts to open and the circuit being monitored to be disconnected. In such construction, the mechanical failure proneness which leads to undetected failure of the functional readiness can be reduced; however, new sources of defects are created in the electronic circuit so that the regular function testing cannot be eliminated.

The aim underlying the present invention essentially resides in providing a fault current safety switch wherein the regular function test can be eliminated, with the fault current safety switch continuously monitoring itself during the entire period of operation, and with the fault current safety switch being adapted to disconnect when the power supply is interrupted and being unable to automatically be switched on again when the power supply returns.

In accordance with the present invention, a fault current safety switch of the aforementioned type is provided wherein, in order to achieve self-monitoring, a current is periodically and briefly fed into an additional winding of the total current converter, with the current simulating a fault current, and the pulse voltage created thereby at the output of an electronic limit value circuit is fed to an evaluation circuit which causes the switch contacts to open and thus switch off the circuit being monitored when no periodic impulses arrive through the electric magnetic holding device.

By virtue of the above noted features of the present invention, a reliable and instant disconnection of the circuit to be monitored is accomplished when a preset fault current is exceeded. In such cases, a voltage appears at the output of the electronic limit circuit which is always so high that the electrical monitoring circuit looses its ability to oscillate and therefore can no longer generate any brief current pulses to supply the additional winding of the total current converter. Similarly, a reliable shut off is achieved in the event of a power failure since, in this situation, the monitoring circuit can no longer periodically generate the brief current pulses for the additional winding. By constructing the monitoring circuit as a circuit which oscillates overall, all parts of the electronic circuitry are involved in an orderly manner so that if one of the electronic components should fail, a reliable shut off is still ensured.

In accordance with further features of the present invention, an evaluation circuit is provided which includes a rectifier voltage doubling circuit, whereby the response sensitivity to a fault current is increased or a lower rated fault current can be set. It is also advantageous in accordance with the present invention to be constructed so as to include a circuit capable of oscillation because of the entire electrical monitoring circuit, with the circuit itself generating the brief feed currents for the additional winding of the total current converter.

In accordance with still further advantageous features of the present invention, it is possible to provide two electronic circuits connected in series with a coil of the electromagnetic holding device, with the first electronic switch being switched by the voltage which appears at the doubling circuit during unimpeded operation and is open briefly and dynamically only when fault current simulation pulses appear, with the second electronic switch being switched dynamically by the first switch and allowing a current to flow into the additional winding of the total current converter when it opens, which total current converter produces a periodic brief fault current simulation. The opening times of the electronic switches are maintained sufficiently short that the armature of the coil of the electromagnetic holding device remains in an attracted state throughout the opening times.

In the last described embodiment, both electronic switches are dynamically coupled in such a fashion that, in the event of a failure of the dynamic processes as a result of the defect in the component, fault current, or zero voltage, a shut off or disconnection will occur with the armature of the holding magnet dropping out and the mechanical switch being triggered. The series connection of the two electronic switches with dynamic serial coupling signal-wise, a reliable shut off of the lifting magnet by the second electronic switch, which will then still be functional, is accomplished in the event of a failure of one of the electronic switching elements.

The above and other objects, features, and advantages of the present invention will become more apparent from the following description when taken in connection with the accompanying drawings which show, for the purpose of illustration only, two embodiments in accordance with the present invention.

BRIEF DESCRIPTION OF THE DRAWINGS

FIG. 1 is a schematic diagram of a fault current switch constructed in accordance with the present invention; and FIG. 2 is a modified embodiment of an auxiliary voltage supply circuit constructed in accordance with the present invention.

DETAILED DESCRIPTION

Referring now to the drawings wherein like reference numerals are used in both views to designate like parts and, more particularly, to FIG. 1, according to this figure, conductors 3, 4 which conduct the current of the circuit to be monitored extend from terminals 1, 2 via switch contacts 5, 6 through core 7 of a total current converter 8 to terminals 9, 10 which serve to connect the circuit being monitored. An operating indicator including an indicating or glow lamp 11 and lead resistor 12, together with a test button 13 with resistor 14, are connected between the conductors 3, 4. When a test button 13 is actuated, a current, limited by the resistor 14, bypasses the total current switch 8, acting as a fault current on a fault current safety switch so that it shuts off the circuit to be monitored. A secondary winding 15 of the total current converter 8, with its fault-current-proportional current, acts on a conventional limit value circuit 16 whose output 17 assumes a positive voltage when the current from the secondary winding 15 exceeds a predetermined value. According to the present invention, the output 17 of the limit value circuit 16 is fed via a resistor 18 and a capacitor 19 to a voltage doubling circuit 23 which includes two rectifiers 20, 21 and a charging capacitor 22.

A core 7 of the total current converter 8 includes an additional winding 24 into which a current is periodically and briefly fed in a manner described more fully hereinbelow. During a normal operation, a pulse train with positive pulses appears via the feedback to the secondary winding 15 and via the limit value circuit 16 at its output 17. A DC voltage of the indicated polarity is formed via the voltage doubling circuit 23 at the capacitor 22, with the DC voltage holding the transistor 27 in a conducting state. The transistor 27 is connected via an emitter resistor 25 and a base resistor 26 to the capacitor 22. Additionally, a zener diode 28 and resistor 29 disposed in parallel thereto are also connected between the base of the transistor 27 and a pulse side of the capacitor 22. When the transistor 27 conducts, a transistor 30, with its base connected to the emitter of the transistor 27, conducts nearly simultaneously. The transistors 27 and 30 form a first electronic switch of the self monitoring circuit according to the present invention.

The transistor 30 has the emitter-collector lead thereof in series with the coil 31 of an electromagnetic holding device 32 for the switch contacts 5, 6 and in series with a collector-emitter lead of an additional transistor 33, which constitutes the second electronic switch of the self-monitoring circuit, to an auxiliary voltage 34. The collector of the transistor 30 is also connected to a base of the transistor 33 by a lead parallel to the coil 31 which contains a capacitor 35 and a resistor 36. The switching point in the circuit between the capacitor 35 and resistor 36 is blocked by a rectifier diode 37 from the negative pole of the auxiliary voltage.

After the transistors 27 and 30 conduct, the transistor 33 is likewise caused to conduct by the auxiliary voltage 34 via capacitor 35 and resistor 36. At this point, the conducting transistor 30, coil 31, and conducting transistor 33 are all connected in series to the auxiliary voltage 34. Consequently, the coil 31 of the electromagnetic holding device is traversed by the current or, in other words, the electromagnetic holding device is excited.

The collector-emitter lead of the transistor 33, together with a resistor 38, is connected in series with the additional winding 24 of the total current converter 8, with the additional winding 24 being connected to the auxiliary voltage 34 via the resistor 38, coil 31, and transistor 30 and is also supplied with current when the transistor 30 conducts, but when transistor 33 conducts, the winding 24 remains practically current-free.

The continuing charging of the capacitor 35 causes the base current of the transistor 33 to be reduced or to decrease and the transistor 33 no longer continues to conduct. Consequently, a current flows into the additional winding 24 of the total current converter 8 through resistor 38, with the current, as described hereinabove, producing a positive voltage pulse through the coupling to the secondary winding 15 and via the limit value circuit 16 at its output 17. Consequently, on the one hand, the direct current voltage on the capacitor 22 of the doubling circuit 23 is maintained and, on the other hand, the positive voltage pulse, via capacitor 39, which is in a lead branch that runs directly from the capacitor 19 to the base of the transistor 27, causes a brief dynamic interruption of the transistor 27 and the transistor 30 as well. During this brief interruption of the current supplied from the auxiliary voltage 34, the energy stored in the coil 31 causes an extraordinarily rapid discharge at the capacitor 35 through a capacitor 40 which is located between the collector and emitter of the transistor 33 and via the diode 37. After the current flow to the capacitor 39 subsides or dies out, the transistors 27 and 30 again conduct since the DC voltage applied to the capacitor 22 and, consequently, transistor 33 also conduct through the switch elements 35, 36. Then, the flow of current through the additional winding 24 ends and the output 17 of the limit value circuits 16, energized by the secondary winding 15, is reduced or drops back to the low voltage.

The ongoing of continual charging of the capacitor 35 which is then resumed, repeats the above-described brief supply of current to the winding 24 and, as apparent, the total self-monitoring circuit is constructed so that it can oscillate whereby a brief supply of current to the additional winding 24 periodically occurs. The construction or dimensioning of the circuit is tuned so as to provide a certain repetition frequency for the respective processes such as, for example, approximately 2 kHz. With such an arrangement, the periodic dynamic current interruption by the transistors 27, 30 is relatively brief and, for example, may be about 20 microseconds. Due to the inertia of the electromagnetic switching device 31, the solenoid remains in an attracted state.

When an auxiliary voltage 34 is switched on for the first time, there is no DC voltage applied to the capacitor 22 and, for this reason, the transistor 27 dynamically conducts via resistors 26, 41, connected in series between its base and a negative pole of the auxiliary voltage, and capacitor 42, so that the periodic process is initiated.

The auxiliary voltage 34 for the power supply to the electronic circuit is generated in a conventional manner by a supply circuit 43 from the line voltage which is connected between terminals 1, 2 and contacts 5, 6 to leads 3, 4. To ensure a starting of the periodic processes, even when the line voltage slowly increases, a thyristor arrangement can be included in the circuit 43 so as to ensure a sudden rise in the auxiliary voltage 34.

In the above described arrangement of the fault current safety switch of the present invention, all circuit components are involved in maintaining the periodic occurring processes. The periodically occurring processes stop when a fault current of the appropriate level occurs since the output 17 of the limit value circuit 16 then remains at a continuous positive potential; however, the processes stop when a defect occurs in the circuit or its components. If the periodic process is interrupted, the coil 31 looses its power supply and, in the event of a short circuit of one of the two electronic circuits 27/30 or 33, the shut off or disconnection is handled by the other circuit and, in this manner, the entire circuit is self monitoring.

The electromagnetic holding device with the coil 31 acts on the contacts 5, 6 in such a manner that, once closed, the contacts 5, 6 are maintained in a closed position throughout an excitation of the electromagnet. If the current flow in the coil 31 is interrupted, thereby resulting in a loss of excitation, whether as a result of the appearance of an overly high fault current or defect in the circuit, the contacts 5, 6 are opened thereby disconnecting or shutting off the circuit to be monitored.

The contacts 5, 6 are not directly closed by a current flow in the coil 31 but rather the contacts may be closed by actuating a switch button 44. For this purpose, a conventional mechanically operated switching lock may be provided for release to perform this function. When the auxiliary voltage generation shown in FIG. 1 is utilized, the contacts 5, 6 can only be closed by the switch button 44 as long as the electromagnetic holding device is excited by the flow of current in the coil 31 thereby preventing the circuit to be monitored from being switched on if no line voltage exists because, for example, of a break in a conductor or insulator. When the auxiliary voltage generation arrangement according to FIG. 2 is utilized, wherein the supply circuit 43 is connected to leads 3, 4 behind the contacts 5, 6, the contacts 5, 6 must first be closed by the actuating switch button 44 and only then can coil 31 conduct current and the electromagnetic holding device be excited. A mechanically operating release arrangement prevents the contacts 5, 6 from being held in the ON position by continuing to hold the ON or switch button 44 when there is no current in the coil 31.

The construction of the present invention provides a fault current safety switch which is capable of shutting off or disconnecting the circuit under protection if the operational readiness fails thereby preventing a continued use of a non-functional fault current safety switch. The arrangement of the present invention eliminates the need for a regular function test as required in conventional fault current safety switches and, the fault current safety switch of the present invention provides an additional advantage in that, after a failure of the line voltage, the circuit to be monitored remains disconnected when the line voltage returns and must be deliberately switched on by using the switch button. With such an arrangement, it is possible to prevent devices or apparatuses which may have been switched on when a line failure occurred from restarting inadvertently when the line voltage returns. Additionally, a shut off following the failure of line voltage prevents dangerous conditions from developing such as those which may occur in the event of a neutral conductor break, from having an effect on the circuit being monitored. In the auxiliary voltage generation arrangement of FIG. 1, the contacts 5, 6 cannot be closed even briefly by actuating the switch button. With the arrangement of FIG. 2, in which the power supply circuit between the line terminals 1, 2 and contacts 5, 6 to which leads 3, 4 are connected, the fault current safety switch advantageously will not carry any current when it is in an OFF state.

The fault current safety switches of the present invention are especially suitable for protecting individual circuits subjected to above average danger such as, for example, sockets used by home craftsmen, hobbyists, gardeners, as well as domestic appliances. Thus, for example, the fault current safety switch may be installed directly in a socket for respective appliances and, the arrangement can be made such that an insertion of the plug in the socket actuates the switch button and the contacts 5, 6 are interrupted when the plug is withdrawn whereby the contacts of the plug, for example, terminals 9, 10 can only be energized as long as the plug is inserted into the socket.

While the foregoing description has shown and described several embodiments in accordance with the present invention, it is understood that the same is not limited thereto but is susceptible to numerous changes and modifications as known to one having ordinary skill in the art and therefore the present invention is not limited to the details shown and described herein, but intend to cover all such modifications as are encompassed by the scope of the appended claims.

I claim:

1. A fault current circuit breaker used in monitoring electrical circuits, comprising:
   a total current converter including a primary circuit having outgoing return leads disposed therethrough;
   a secondary winding;
   an electromagnetic retaining device controlled by an electronic limit value circuit and containing a coil, said electronic limit value circuit being connected to said secondary winding; and
   switch contacts controlled by said electromagnetic retaining device for switching off an electrical circuit being monitored when a predetermined fault current is exceeded,
   said electronic limit value circuit, said coil and an evaluation circuit forming an oscillator circuit that generates current pulses which are supplied to an additional winding of said total current converter for simulating a fault current, said current pulses being temporarily stored in said additional winding of said total current converter and causing voltage pulses corresponding to said current pulses at the output of said electronic limit value circuit,
   said voltage pulses controlling said electromagnetic retaining device such that during normal operation, which corresponds to a condition that no actual fault current appears, said current pulses causing a sufficiently short de-energizing of said coil to allow said oscillator circuit to continue oscillating, and such that during an actual fault operation, which corresponds to a condition that an actual fault current appears, said oscillator circuit is interrupted causing said coil to be permanently de-energized, causing said switch contacts to open so as to shut off said primary circuit.

2. A fault current circuit breaker according to claim 1, wherein said evaluation circuit includes a rectifier voltage doubling circuit.

3. A fault current circuit breaker according to claim 1, wherein said evaluation circuit includes at least two switch means connected in series with said coil of said electromagnetic retaining device, a first switch means of said at least two switch means being maintained in a conducting condition during said normal operation, a second switch means of said at least two switch means being controlled by said first switch means such that when said second switch means is opened, a current flows into said additional winding of said total current converter thereby causing a simulated fault current periodically, said second switch means being opened for a sufficiently short time so that an armature of said coil remains in a steady position.

4. A fault current circuit breaker according to claim 3, wherein said conducting condition for said first switch means corresponds to a condition where said second switch means briefly and continuously opens and closes.

* * * * *